(12) United States Patent
Egawa et al.

(10) Patent No.: US 12,606,245 B2
(45) Date of Patent: Apr. 21, 2026

(54) VEHICLE REAR STRUCTURE

(71) Applicant: TOYOTA JIDOSHA KABUSHIKI KAISHA, Aichi-ken (JP)

(72) Inventors: Yuta Egawa, Okazaki (JP); Hiroki Hashimoto, Toyota (JP); Hiroyuki Manjo, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 384 days.

(21) Appl. No.: 18/393,673

(22) Filed: Dec. 22, 2023

(65) Prior Publication Data

US 2024/0208576 A1      Jun. 27, 2024

(30) Foreign Application Priority Data

Dec. 26, 2022      (JP) ................................. 2022-207924

(51) Int. Cl.
| | |
|---|---|
| *B62D 21/03* | (2006.01) |
| *B62D 21/11* | (2006.01) |
| *B62D 21/15* | (2006.01) |
| *B62D 25/02* | (2006.01) |
| *B62D 25/04* | (2006.01) |

(Continued)

(52) U.S. Cl.
CPC ........... *B62D 21/152* (2013.01); *B62D 21/03* (2013.01); *B62D 21/11* (2013.01); *B62D 25/025* (2013.01); *B62D 25/04* (2013.01); *B62D 25/088* (2013.01); *B62D 25/20* (2013.01); *B62D 25/2027* (2013.01)

(58) Field of Classification Search
CPC .... B62D 25/152; B62D 25/088; B62D 21/03; B62D 21/11; B62D 25/025; B62D 25/04; B62D 25/20; B62D 25/2027
See application file for complete search history.

(56) References Cited

U.S. PATENT DOCUMENTS

| | | | |
|---|---|---|---|
| 2020/0231219 A1* | 7/2020 | Tsukamoto | ........ B62D 25/2027 |
| 2021/0016840 A1 | 1/2021 | Moss et al. | |

(Continued)

FOREIGN PATENT DOCUMENTS

| | | |
|---|---|---|
| DE | 102009041358 A1 | 4/2010 |
| JP | 2009-120063 A | 6/2009 |

OTHER PUBLICATIONS

"Aluminum space frame of Audi R8", Jun. 2009, 2pp.
"Aluminum space frame of Ferrari 488", Sep. 27, 2017, 2pp.
"Aluminum space frame of Mercedes AMG-GT", Jun. 24, 2019, 2pp.

*Primary Examiner* — Daniel J Colilla

(74) *Attorney, Agent, or Firm* — HAUPTMAN HAM, LLP

(57) ABSTRACT

A vehicle rear structure has a rear assembly, a floor cross member disposed at a rear end of a floor panel and extending from an inside edge of the rear assembly to a floor tunnel opening edge, and a reinforcement member extending from the floor cross member diagonally outward and rearward and connected to an inner side surface of the rear assembly. The rear assembly is an integrally-cast hollow member, including: a main body part having a closed cross-section and connected to the rear pillar and a rear member; a tower part connected to an upper end of the main body part and partially accommodating a suspension; and a suspension member part having a closed cross-section and disposed below the main body part and having front end connected to the rocker and the rear pillar.

2 Claims, 4 Drawing Sheets

(51) Int. Cl.
    B62D 25/08         (2006.01)
    B62D 25/20         (2006.01)

(56)             References Cited

U.S. PATENT DOCUMENTS

2021/0221445 A1 *   7/2021   Kuwada ................. B62D 25/04
2023/0391403 A1 *  12/2023   Liu ..................... B62D 25/088

* cited by examiner

VEHICLE REAR STRUCTURE

CROSS REFERENCE TO RELATED APPLICATION

This application claims priority to Japanese Patent Application No. 2022-207924 filed on Dec. 26, 2022, which is incorporated herein by reference in its entirety including the specification, claims, drawings, and abstract.

TECHNICAL FIELD

The present disclosure relates to a vehicle rear structure.

BACKGROUND

In the past, various vehicle rear structures have been proposed to improve strength and rigidity.

For example, JP-2009-120063-A discloses a vehicle body structure including reinforcement members having braces fixed to a rear side member and a rear cross member. This configuration is said to be able to suppress the deformation of the rear side member and improve the reaction force of the vehicle because the reinforcement member can receive the input load when the vehicle is struck from the side-impact side.

In general, a suspension, a suspension member, a suspension tower, and a rear side member are disposed at the rear of a vehicle. For example, the strength in the vehicle rear structure may be improved by setting a thicker plate thickness for the members used for the suspension tower and the like.

CITATION LIST

Patent Literature

Patent Document 1: JP-2009-120063-A

SUMMARY

In some approaches, in the vehicle rear structure, devising of increasing the strength of the structure may cause other problems. For example, thicker plate thicknesses of the structural members increase the vehicle weight. In addition, increasing the complexity of the structure may lead to an increase in man-hours and costs for production.

The present specification, therefore, realizes a vehicle rear structure that can reduce weight while maintaining strength and rigidity.

A vehicle rear structure, includes: a rear assembly connected to a rear end of a rocker and a rear pillar attached to a rear end portion of the rocker, the rear assembly extending rearward of a vehicle; a floor cross member disposed at a rear end of a floor panel and extending inwardly in a vehicle width direction from an inside edge of the rear assembly in the vehicle width direction to a floor tunnel opening edge of the floor panel; and a reinforcement member connected to the floor cross member and the rear assembly, the reinforcement member extending from the floor cross member diagonally outward and rearward in the vehicle width direction and connected to an inner side surface of the rear assembly in the vehicle width direction. The rear assembly is an integrally-cast hollow member, the rear assembly including a main body part, a tower part, and a suspension member part. The main body part is a member having a closed cross-section, the main body part extending in a front-rear direction of the vehicle and connected to the rear pillar and a rear member disposed at a rear part of the vehicle. The tower part is connected to an upper end of the main body part and has a space to partially accommodate a suspension. The suspension member part is a member having a closed cross-section, the suspension member extending in the front-rear direction of the vehicle below the main body part and having front end connected to the rocker and the rear pillar.

According to the above configuration, the rear assembly is formed by integrally-casting, and each of the main body part and the suspension member part has a closed cross-section, which makes the rear assembly stronger than when assembled by spot welding or the like. In addition, weight reduction due to thinner wall thickness is possible. In addition, the above configuration makes it possible to reduce man-hours for welding and other joining processes and to reduce costs by reducing the number of separate members in the rear assembly.

The vehicle rear structure is characterized in that the reinforcement member is connected to an inner side of the suspension member part in the vehicle width direction, and the truss structure includes the reinforcement member, the floor cross member, and the suspension member part.

According to the above configuration, the vehicle rear structure with higher strength and rigidity can be realized by the truss structure.

According to the vehicle rear structure disclosed herein, it is possible to realize a configuration that can reduce weight while maintaining strength and rigidity. In addition, the formation of the structure by integrally-casting enables a reduction in man-hours required for joining and a reduction in cost by reducing the number of separate members of the rear assembly.

BRIEF DESCRIPTION OF DRAWINGS

Embodiment of the present disclosure will be described based on the following figures, wherein.

DESCRIPTION OF EMBODIMENT

A vehicle rear structure is described below with reference to the drawings. In the following description, the vehicle rear structure of the right side portion of the vehicle will be described. The left side vehicle rear structure is generally symmetrical to the right side vehicle rear structure, and therefore, the description will be omitted. In each figure, "Fr," "Up," and "Rh" indicate the front, upper, and right side of the vehicle, respectively.

Figure 1:
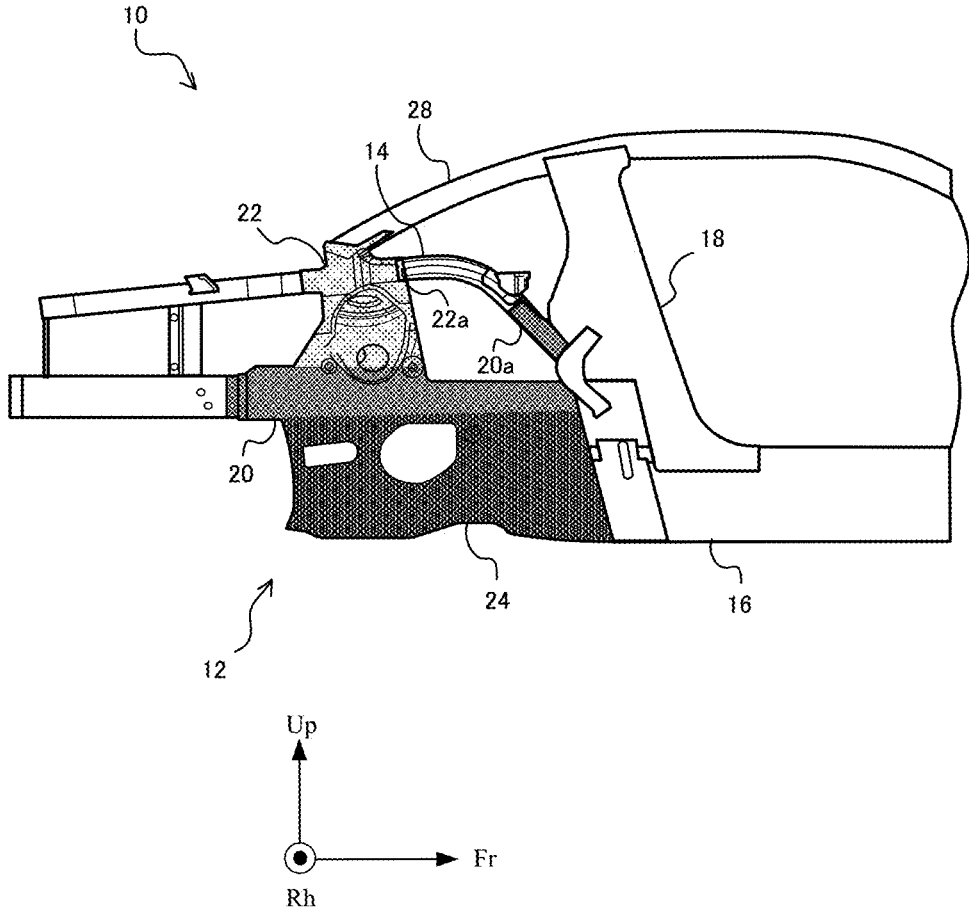
FIG. 1 depicts a schematic side view of a vehicle rear structure.
Figure 2:
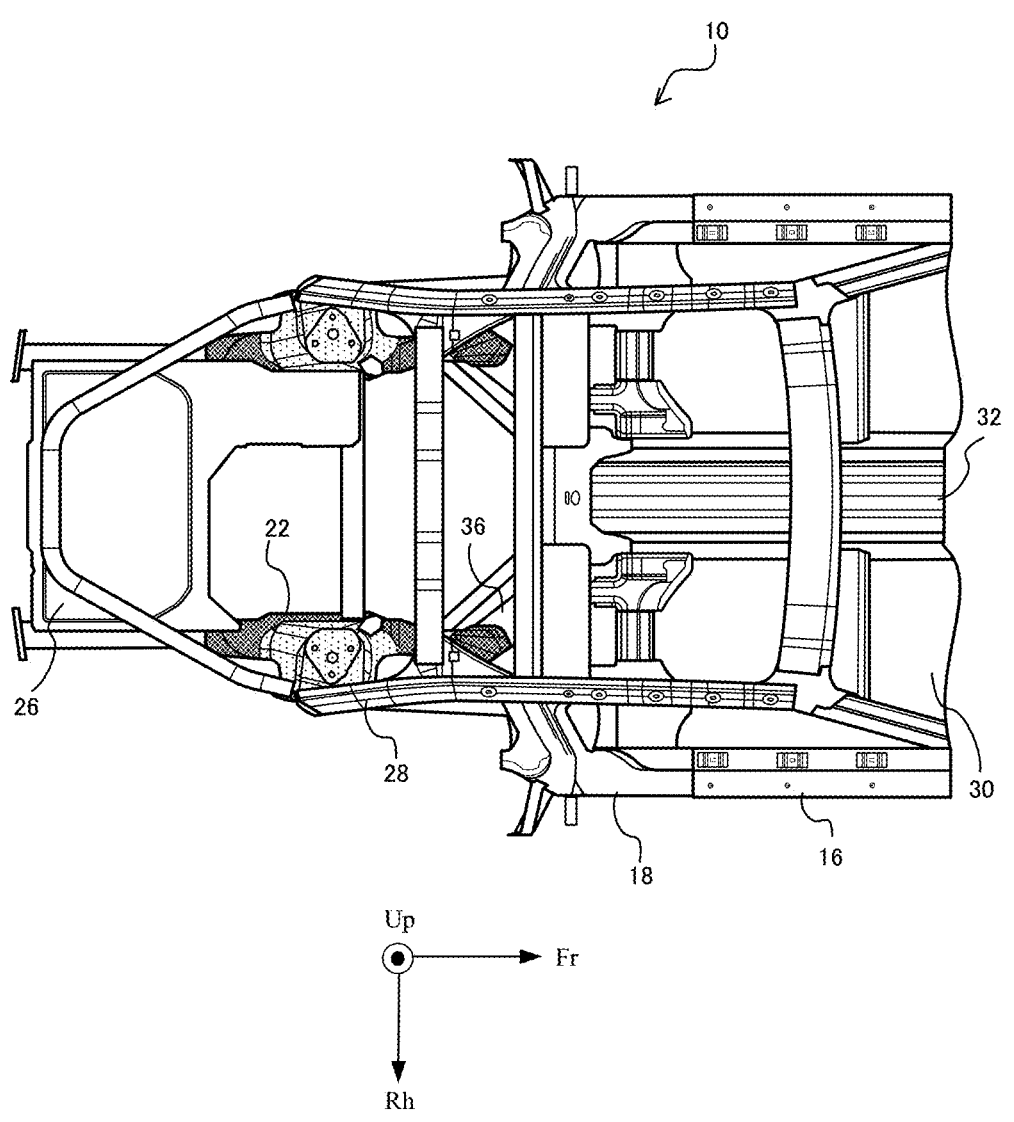
FIG. 2 depicts a plan view of the vehicle rear structure of FIG. 1.
Figure 3:
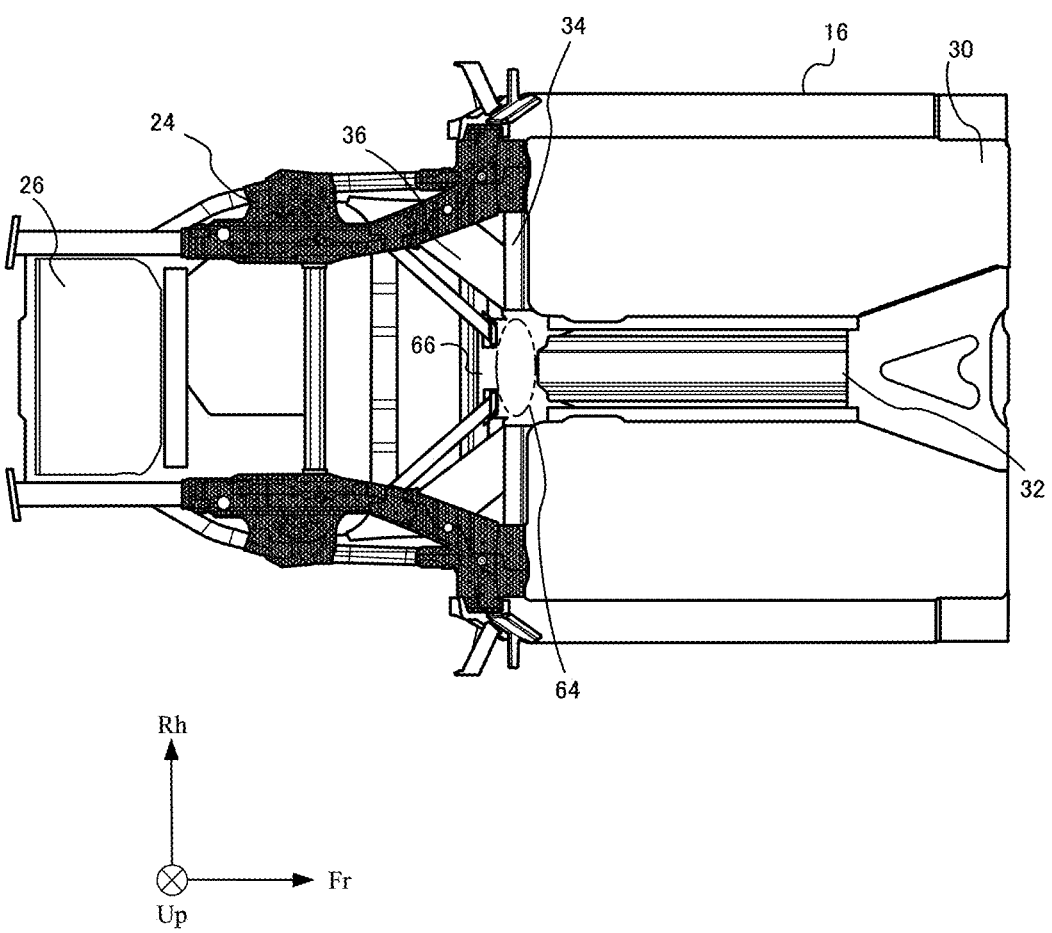
FIG. 3 depicts a bottom view of the vehicle rear structure of FIG. 1.

FIG. 1 is a schematic side view of a vehicle rear structure. More particularly, FIG. 1 represents a rear assembly 12, which is a component in the vehicle rear structure of the vehicle 10, and the main components around the rear assembly 12. Accordingly, other components are omitted from the figures and explanations as appropriate. FIG. 2 is a plan view of the vehicle rear structure of FIG. 1, and FIG. 3 is a bottom view of the vehicle rear structure of FIG. 1.

As depicted in FIG. 1, the vehicle rear structure has the rear assembly 12, a connecting member 14, a rocker 16, and a rear pillar 18.

The rear assembly 12 is an integrally-cast hollow member and includes a main body part 20, a tower part 22, and a suspension member part 24. The rear assembly 12 is a cast member made of a metal such as aluminum. As depicted in FIG. 1, the rear assembly 12 is connected to the rear end of the rocker 16 and the rear pillar 18 and extends to the rear of the vehicle. An assembly part 20a is formed at the front upper corner of the main body part 20. The assembly part 20a is the part to which the front end of the connecting member 14 is connected. A receiving seat 22a is formed near the upper end and at the front end of the tower part 22. The receiving seat 22a is the portion to which the rear end of the connecting member 14 is connected. Details of the rear assembly 12 will be described later with reference to FIG. 4.

The connecting member 14 is a long member with a closed cross-section. In this example, the connecting member 14 is a square cylindrical extruded member. The connecting member 14 may be a cast member made of the same metal as the rear assembly 12, such as aluminum, or the connecting member 14 may be a steel pipe. Further, the connecting member 14 may be cylindrical. The connecting member 14 is connected to the rear pillar 18 and the rear assembly 12 at its front end and connected to the tower part 22 at its rear end. In other words, the connecting member 14 is a member connecting the main body part 20 of the rear assembly 12 to the tower part 22. More particularly, the connecting member 14 is connected above the position where the rear pillar 18 and the main body part 20 of the rear assembly 12 are connected (at the assembly part 20a depicted in FIG. 1). The connecting member 14 extends from above the connection position between the rear pillar 18 and the main body part 20 to the upper end of the tower part 22 (the receiving seat 22a portion depicted in FIG. 1) in a diagonal upward direction behind the vehicle.

The rocker 16 has a square closed cross-sectional shape and is provided at the lower side edge of the vehicle 10 (specifically, at a position directly below the left and right doors) and extends in the front-back direction of the vehicle.

The rear pillar 18 has a closed cross-sectional shape, is provided at the rear side of the vehicle 10, and extends in the vertical direction of the vehicle. More particularly, the rear pillar 18 is attached to the rear end of the rocker 16 and extends upwardly from the rocker 16.

Next, the surrounding members of the rear assembly 12 will be further described. As depicted in FIGS. 1 to 3, the vehicle rear structure further includes a rear member 26, a roof rail 28, a floor panel 30, a floor tunnel 32, a floor cross member 34, and a reinforcement member 36.

The rear member 26 is disposed at the rear of the vehicle, and an end portion of the rear member 26 is connected to the rear end of the rear assembly 12.

The roof rail 28 is a member disposed at the boundary between the roof and the side of the vehicle 10. The roof rail 28 is a closed cross-sectional long member and extends in the front-rear direction of the vehicle at the upper side end of the vehicle 10. As depicted in FIG. 1, the central portion of the roof rail 28 is connected to the upper end of the rear pillar 18. The rear portion of the roof rail 28 extends diagonally rearward of the vehicle from that connection position toward the upper end of the tower part 22, and the rear end of the roof rail 28 is connected to the upper end of the tower part 22.

The floor panel 30 is a member forming the lower floor of the vehicle 10.

The floor tunnel 32 is a member provided in the approximate center of the lower side of the vehicle 10 in the vehicle width direction and extending in the front-rear direction of the vehicle. The configuration of the rear part of the floor tunnel 32 and the surroundings of the floor tunnel 32 will be described later with reference to FIG. 3.

The floor cross member 34 is disposed at the rear end of the floor panel 30 and extends from the rear assembly 12 to the floor tunnel 32. More particularly, the floor cross member 34 extends from the inside of the suspension member part 24 in the vehicle width direction toward the rear end opening of the floor tunnel 32. The floor cross member 34 is disposed in parallel with the vehicle width direction. Therefore, the floor cross member 34 is connected near the front end of the suspension member part 24.

The reinforcement member 36 is a member that is crossed over the floor cross member 34 and the suspension member part 24 of the rear assembly 12. As depicted in FIG. 3, the reinforcement member 36 extends from the floor cross member 34 diagonally outward and rearward in the vehicle width direction and is connected to the inner side of the suspension member part 24 of the rear assembly 12. In other words, the floor cross member 34 is connected to the suspension member part 24 forward of the center portion of the suspension member part 24 in the front-rear direction of the vehicle and rearward of the floor cross member 34 and the suspension member part 24.

Figure 4:
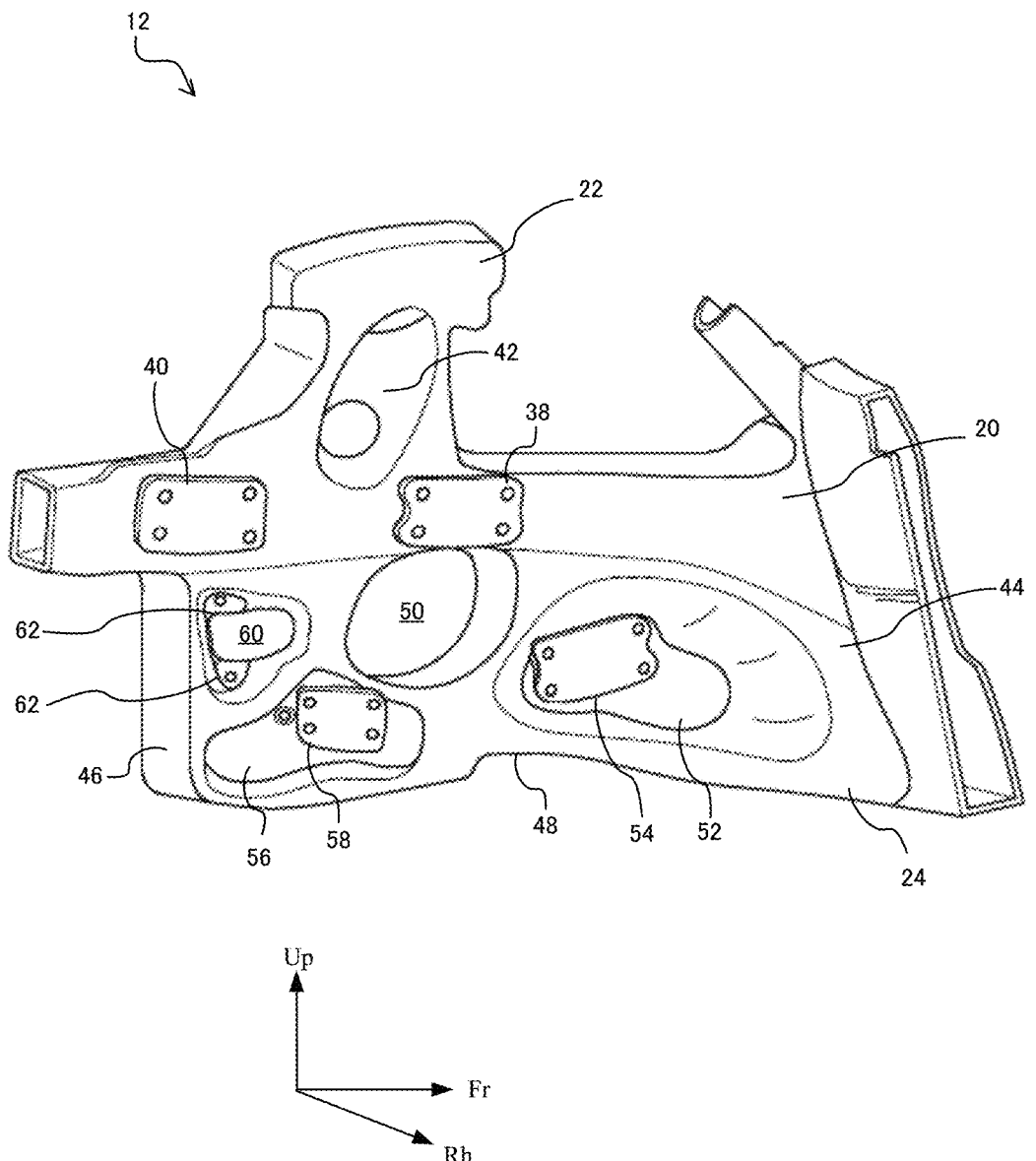
FIG. 4 depicts a diagram of a rear assembly.

Next, the rear assembly 12 will be described with reference to FIGS. 1 to 4. FIG. 4 is a diagonal view of the rear assembly. As previously described, the rear assembly 12 is an integrally-cast hollow member and consists of the main body part 20, the tower part 22, and the suspension member part 24. In FIGS. 1 to 3, to distinguish the main body part 20, the tower part 22, and the suspension member part 24, the tower part 22, which is located at the top in the vertical direction of the vehicle, is depicted as a lightly inked area, and the suspension member part 24, which is located at the bottom, is depicted as a darkly inked area, for clarity of viewing. The main body part 20 in the middle is depicted in the middle color of the lightly inked area and the darkly inked area.

The main body part 20 is at least partially a closed cross-section, extending in the front-back direction of the vehicle. The front end of the main body part 20 is connected to the rocker 16 and the rear pillar 18. Although it is assumed here that the main body part 20 is connected to the rocker 16 and the rear pillar 18, it may be connected via a connecting member, for example. The rear end of the main body part 20 is connected to a portion of the end of the rear member 26 (more particularly, to the end of the rear side member that is included in the rear member 26).

As depicted in FIG. 4, pedestals 38 and 40 are provided on the surface of the right side plate of the main body part 20. The pedestals 38 and 40 are the portions to which the arm bracket (not depicted) to which the upper arm (not depicted) of the suspension (not depicted) is connected are fixed. The pedestals 38 and 40 are provided with bolt holes for fixing the arm bracket.

The tower part 22 is connected to the upper end of the main body part 20 and has a recessed portion 42 that accommodates a portion of the suspension. Tower part 22 includes a right side plate, a left side plate, a front plate, a rear plate, and a ceiling plate. The right side plate, left side plate, front plate, and rear plate define a closed cross-sectional structure extending upward from the main body part 20. The roof rail 28 is connected to the right end of the ceiling plate (see FIG. 2). As mentioned above, the tower part 22 has a receiving seat 22a (see FIG. 1). The receiving seat 22a is the area to which the rear end of connecting member 14 is assembled (that is, to which connecting member 14 is fixed). The receiving seat 22a may be open at the top and closed at the bottom. With this configuration, the connecting member 14 can be inserted from above and secured. As mentioned above, the connecting member 14 may be made of the same material as the rear assembly 12 or a different material. Furthermore, the connecting member 14 may be an integral part of the rear assembly 12.

The suspension member part 24 is a portion that is at least partially in a closed cross-section and extends in the front-rear direction of the vehicle below the main body part 20. As depicted in FIG. 4, the suspension member part 24 consists of a right side plate 44, a left side plate (not depicted), a rear plate 46, and a bottom plate 48. The suspension member part 24 is a hollow member with a closed cross-section, which is surrounded on the right, left, rear, front, bottom, and top sides by the right side plate 44, left side plate, rear plate 46, front plate (not depicted), bottom plate 48, and the bottom plate (not depicted) of the main body part 20. The front plate of the suspension member part 24 includes the portion connected to the rocker 16 and the rear pillar 18.

As depicted in FIG. 4, a cylindrical opening 50 is provided in the center of the suspension member part 24, through which the drive shaft (not depicted) of the vehicle 10 passes. A mortise-shaped recessed portion 52 is provided at the front of the right side plate 44. The bottom of the recessed portion 52 is flat. A pedestal 54 is provided at the bottom of the recessed portion 52. On the lower rear side of the right side plate 44, a recessed portion 56 is provided, the recessed portion 56 being recessed in a stepped shape from the surface of the right side plate 44. A pedestal 58 is provided at the bottom of the recessed portion 56. An oval-shaped opening 60 is provided at the rear upper side of the right side plate 44. The periphery of the opening 60 is connected to the surface of the right side plate 44 by a sloping curved surface. Pedestals 62 are provided at the top and bottom of the opening 60, respectively. The pedestals 54 and 58 are portions where the arm brackets to which the lower arms of the suspension (not depicted) are connected are fixed. Pedestal 62 is the portion to which the arm bracket to which the middle arm of the suspension (not depicted) is connected is fixed. The pedestals 54, 58, and 62 are each provided with bolt holes for fixing the arm bracket.

Here, as described above, the rear assembly 12 is a hollow member, and therefore, it is lighter than a solid member. Furthermore, the strength is improved by the above configuration. That is, in general, the connecting members of the three members that are included in the rear assembly 12 tend to be fragile areas where stress is concentrated. However, by forming the three members by integrally-casting, such connecting members can be eliminated, and the strength of the vehicle around the suspension is improved. As a result, the vehicle rear structure disclosed herein can be both strong and lightweight. Furthermore, the rear assembly 12 is formed integrally-casting, which enables a reduction in man-hours for joining and a reduction in cost by reducing the number of separate members. In addition, the reduction in the number of separate members enables further weight reduction of the vehicle.

Referring now to FIG. 3, the configuration of the rear portion of the floor tunnel 32 and the surrounding area of the floor tunnel 32 will be described. The area circled by the double-dotted line in FIG. 3 is the opening at the rear end of the floor tunnel 32. Hereafter, that portion is referred to as the "floor tunnel opening edge" and is indicated by the reference symbol 64. As depicted in FIG. 3, the rear portion of the floor tunnel 32, including the floor tunnel opening edge 64, is covered by a tunnel assembly member 66.

Therefore, the floor tunnel opening edge 64 is depicted as an imaginary line enclosed by a double-dashed line.

The tunnel assembly member 66 is a member attached to the rear end of the floor tunnel 32. As previously described, the floor cross member 34 extends from the inside of the suspension member part 24 in the vehicle width direction toward the rear end opening of the floor tunnel 32. Also, one end of the floor cross member 34 is joined to the tunnel assembly member 66. The reinforcement member 36 extends from the floor cross member 34 diagonally outward and rearward in the vehicle width direction and is connected to the inside surface of the suspension member part 24 in the vehicle width direction. Here, at the connection between the reinforcement member 36 and the floor cross member 34, the reinforcement member 36 is also joined to the tunnel assembly member 66. That is, the floor cross member 34 and the reinforcement member 36 extending toward the floor tunnel 32 are connected to the floor tunnel 32 via the tunnel assembly member 66.

Here, the floor tunnel 32 is a plate-shaped member with a hat-shaped cross section in the front view. Therefore, the thickness of the floor tunnel 32 is reduced. Therefore, when the load from the floor cross member 34 and reinforcement member 36 is directly transferred to the floor tunnel 32 when the vehicle 10 is rear-ended, the floor tunnel 32 is not able to sufficiently support the load. On the other hand, the tunnel assembly member 66 can be made stronger than the floor tunnel 32 by increasing its thickness in the vehicle width direction. As a result, the input load transmitted from the floor cross member 34 and the reinforcement member 36 can be received by the tunnel assembly member 66 before being transmitted to the floor tunnel 32. In other words, the overall strength and rigidity of the vehicle rear structure can be improved because the load on each member of the vehicle rear assembly is reduced.

Furthermore, as depicted in FIG. 3, the reinforcement member 36, the floor cross member 34, and the suspension member part 24 form a truss structure in which the cross section orthogonal to the vehicle width direction forming an abbreviated triangle. In the truss structure, only compressive or tensile forces are generated in the axial direction when a load is applied to each of the members that make up an abbreviated triangle, making it difficult to bend the abbreviated triangle. In other words, the structure in which the truss structure is provided makes the vehicle rear structure disclosed herein stronger and more rigid.

The description so far is an example, and the vehicle rear structure disclosed herein includes: a rear assembly, which is an integrally-cast hollow member and includes a main body part, a tower part, and a suspension member part; a floor cross member, which is disposed at the rear end of the floor panel and extends inwardly in the vehicle width direction from the inner end of the suspension member part in the vehicle width direction to the floor tunnel opening edge; and a reinforcement member, which extends diagonally from the floor cross member outward and rearward in the vehicle width direction and is connected to the inner side of the suspension member part in the vehicle width direction. Therefore, other configurations of the vehicle rear structure may be modified as appropriate.

REFERENCE SIGNS LIST 10 vehicle, 12 rear assembly, 14 connecting member, 16 rocker, 18 rear pillar, 20 main body part, 22 tower part, 24 suspension member part, 26 rear member, 28 roof rail, 30 floor panel, 32 floor tunnel, 34 floor cross member, 36 reinforcement member, 64 floor tunnel opening edge, 66 tunnel assembly member.

The invention claimed is:

1. A vehicle rear structure, comprising:

a rear assembly connected to a rear end of a rocker and a rear pillar, wherein the rear pillar is attached to a rear end portion of the rocker, and the rear assembly extends rearward of a vehicle;

a floor cross member disposed at a rear end of a floor panel and extending inwardly in a vehicle width direction from an inside edge of the rear assembly in the vehicle width direction to a floor tunnel opening edge of the floor panel; and a reinforcement member connected to the floor cross member and the rear assembly, the reinforcement member extending from the floor cross member diagonally outward and rearward in the vehicle width direction and connected to an inner side surface of the rear assembly in the vehicle width direction, wherein the rear assembly is an integrally-cast hollow member, the rear assembly comprising a main body part, a tower part, and a suspension member part, the main body part being a member having a closed cross-section, the main body part extending in a front-rear direction of the vehicle and connected to the rear pillar and a rear member disposed at a rear part of the vehicle, the tower part being connected to an upper end of the main body part and having a space to partially accommodate a suspension, and the suspension member part having a closed cross-section, the suspension member extending in the front-rear direction of the vehicle below the main body part and having a front end connected to the rocker and the rear pillar.

2. The vehicle rear structure according to claim 1, wherein the reinforcement member is connected to an inner side of the suspension member part in the vehicle width direction, and a truss structure is formed by the reinforcement member, the floor cross member, and the suspension member part.

\* \* \* \* \*